United States Patent
Kuyper-Hammond et al.

(10) Patent No.: US 8,130,419 B2
(45) Date of Patent: Mar. 6, 2012

(54) EMBEDDING AUTHENTICATION DATA TO CREATE A SECURE IDENTITY DOCUMENT USING COMBINED IDENTITY-LINKED IMAGES

(75) Inventors: Michael Peter Kuyper-Hammond, Kaltbrunn (CH); Michael Charles Osborne, Au (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 12/201,089

(22) Filed: Aug. 29, 2008

(65) Prior Publication Data
US 2010/0053691 A1    Mar. 4, 2010

(51) Int. Cl.
*H04N 1/40* (2006.01)
*H04N 1/46* (2006.01)
*G06K 15/00* (2006.01)
*G06K 9/00* (2006.01)
*G06K 9/36* (2006.01)
*G09G 5/24* (2006.01)
*G09G 5/00* (2006.01)

(52) U.S. Cl. ...... 358/3.28; 358/1.18; 358/540; 382/100; 382/115; 382/135; 382/284; 345/469.1; 345/636; 345/640

(58) Field of Classification Search ................. None
See application file for complete search history.

(56) References Cited

FOREIGN PATENT DOCUMENTS
CN          1710610 A  * 12/2005
WO     WO 2006/066927     6/2006

* cited by examiner

*Primary Examiner* — Twyler Haskins
*Assistant Examiner* — Barbara Reinier
(74) *Attorney, Agent, or Firm* — Ryan, Mason & Lewis, LLP

(57) ABSTRACT

Techniques for creating an identity document are provided. The techniques include obtaining two or more identity-linked images, deriving one or more at least partially transparent regions from one of the two or more identity-linked images, combining the two or more identity-linked images to create a combined image, and embedding authentication data into the combined image, inside the one or more at least partially transparent regions, to create an identity document.

25 Claims, 7 Drawing Sheets

EMBEDDING AUTHENTICATION DATA TO CREATE A SECURE IDENTITY DOCUMENT USING COMBINED IDENTITY-LINKED IMAGES

FIELD OF THE INVENTION

The present invention generally relates to information technology, and, more particularly, to identity security.

BACKGROUND OF THE INVENTION

Secure identity tokens such as, for example, identification (ID) cards, licenses and passports currently carry multiple, disjointed identity-linked fields (for example, a photo, signature and name). In such existing approaches, each feature is obtained and personalized separately, creating disadvantageous effects.

For example, human-readable identity documents in existing approaches generally feature multiple images corresponding to the same document holder (identity-linked images) without establishing a direct link between images. On typical documents, each field (including images) is deposited into a dedicated, rectangular area and completely obscures any surface security features.

SUMMARY OF THE INVENTION

Principles of the present invention provide techniques for combining identity-linked images. An exemplary method (which may be computer-implemented) for creating an identity document, according to one aspect of the invention, can include steps of obtaining two or more identity-linked images, deriving one or more at least partially transparent regions from one of the two or more identity-linked images, combining the two or more identity-linked images to create a combined image, and embedding authentication data into the combined image, inside the one or more at least partially transparent regions, to create an identity document.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
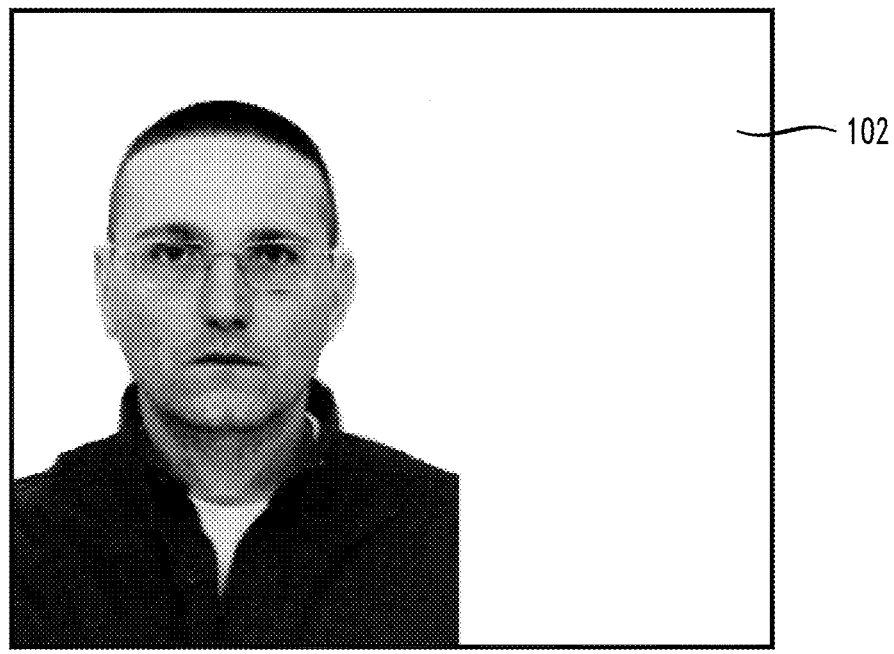
FIG. 1 is a diagram illustrating an original facial image, repositioned, according to an embodiment of the present invention.

Principles of the present invention include creating identity-linked images (for example, images corresponding to the same document and/or token holder and/or user, images that identify the same document and/or token holder and/or user, etc., such as a photograph, signature, etc.) on secure tokens, as well as increasing the security of a document and/or identity card. Additionally, one or more embodiments of the invention include merging multiple identity-linked images to establish a direct visual link between the images and the document background.

As described herein, one or more embodiments of the invention create a combined image with non-rectangular visible boundaries, making it more difficult to replace or remove the image without noticeable distortion. Additionally, data-dependent, at least partially transparent regions can be created within the combined image, which allow the deposited image to include security features of the underlying medium. Further, transparent (or at least partially transparent) regions can be used to store authentication data (such as, for example, message authentication codes (MACs)) within the combined image where it may be easily retrieved through image-processing techniques.

One or more embodiments of the invention combine, in a secure fashion, different levels of information into two dimensions in a pre-personalization process. The resulting output can be applied as a single image during personalization. For example, an illustrative embodiment of the invention combines mixed-type identity-linked images with in-band authentication.

As noted above, existing approaches include digitally-enhanced documents that carry multiple, disjoint identity-linked image fields even if they are derived from the same data sources. Identity documents can feature, for example, high-resolution facial images of the document holder, and handwritten signatures or similar secondary images. Each image file is obtained and stored separately, and is engraved to the card in a dedicated rectangular area (such as, for example, the one visible in FIG. 10). Also, in existing approaches, personalization writes a gray-scale image on the surface, relying on the background providing white, and white regions are not written during engraving.

In contrast to the disadvantageous existing approaches, one or more embodiments of the present invention overlay multiple identity-linked images in a way that establishes non-rectangular regions with transparent areas that depend on one or more of source images and a security-printed background. Combining images establishes a human-visible link between images of different types, which remains useful even if an electronic data carrier (such as an embedded smart chip) is damaged and no longer readable. Combined images with non-rectangular boundaries also hinder replacement or modification.

The techniques described herein create at least partially transparent regions within the image which allow display of security features on the surface, visually combining the combined image with the document background. Replacing or modifying a non-rectangular, partially transparent image is significantly more difficult than doing so to rectangular, opaque areas. Typically, one would turn less relevant portions of images transparent, in a shape determined by one or all constituent image. Including transparent regions effectively combines identity-linked images with document-specific, non-personalized security features.

One or more embodiments of the invention derive a transparent band from one of the source images, and remove portions of the other image(s) that would fall within the band. One of the identity-linked images can be, for example, a signature, with easily recognizable strokes. When deriving a transparent band that surrounds strokes of a signature, one creates a characteristic and easily recognizable transparent region, tightly coupled with the shape of the signature. In the example in FIG. 7, a facial image and a signature image are combined in a layout suitable for most identity documents. Strokes of a signature are useful guides to specify the transparent band. If aligned properly, a transparent band around a signature removes non-relevant portions of the facial image.

Expanding a signature to define a transparent band creates a region which is easy to detect due to high contrast and lack of noise (as one is removing parts of other images that may fall into this region). One or more embodiments of the invention use transparent areas to embed a document-specific MAC into the combined image. The MAC may be trivially detected and verified during automated processing, and does not interfere with visual reading. The MAC can be embedded into a band inside the transparent region (the carrier), created at a uniform distance from both the signature and the facial image.

The position of the carrier, in a high-contrast, noise-free region, allows robust retrieval when the image is scanned. Any robust encoding may be used to modulate the carrier. In an exemplary embodiment of the invention, one can use classical one-dimensional (1D) barcode techniques to create vertical stripes. This content may also be, for example, trivially reconstructed by calculating a horizontal histogram of the modulated carrier.

While combining identity-linked images can be an offline operation and can incurs significant run-time costs, it may usually be overlapped with card production. In practical environments, for example, production throughput can be limited by production machinery latency (mechanical processing), and one can be allowed to introduce reasonable additional per-document latencies without impacting aggregate throughput.

As described herein, the image combination techniques described herein can include the following characteristics. Identity-linked images can be combined to create a personalized engraving template for identity documents. Transparent regions can be derived from one of the identity-linked images (for example, a signature, which has characteristic strokes). Also, one can remove regions of one or more identity-linked images (for example, less-characteristic regions such as, for example, corners of facial images) where they would overlap with transparent bands.

Figure 7:
FIG. 7 is a diagram illustrating a combined image, without authentication data, according to an embodiment of the present invention.

The augmented identity-linked images can be combined to create a combined image, allowing security-printed background to show through (for example, as in the white areas of FIG. 7). A message authentication code (MAC) can be embedded into the combined image, inside at least partially transparent regions, where it may be easily recognized. Additionally, one can choose a robust encoding to encode the MAC to allow recovery even when read with low-resolution scanning equipment. Also, the combined image can be engraved onto the identity document (for example, a security-printed identity document). This process effectively couples the combined image with the security-printed background.

An exemplary embodiment of the invention is depicted in FIG. 1 through FIG. 9, as described below. Exemplary images can be generated by the following process.

Figure 2:
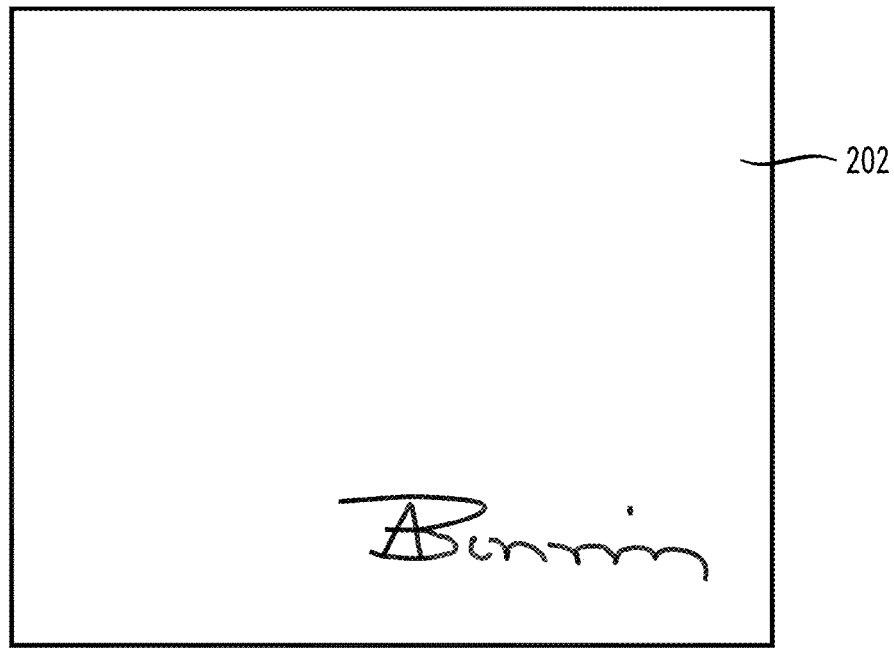
FIG. 2 is a diagram illustrating an original signature, repositioned, according to an embodiment of the present invention.
Figure 3:
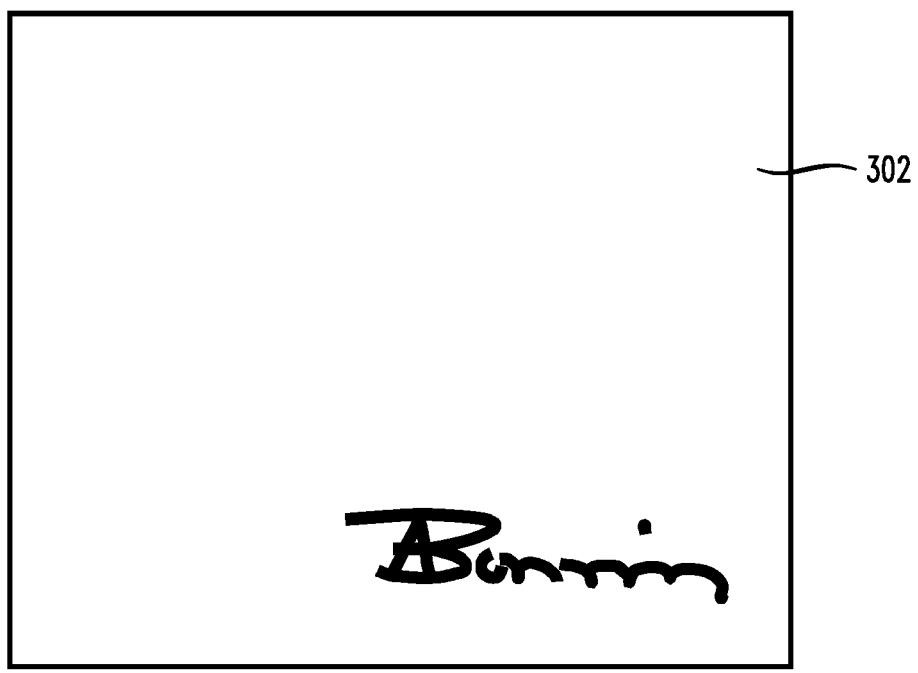
FIG. 3 is a diagram illustrating a signature region, including signature and transparent areas, according to an embodiment of the present invention.

As depicted in FIG. 1, a diagram illustrating an original facial image 102, repositioned, according to an embodiment of the present invention, one can reposition the facial image and create a larger image with the dimensions of the intended combined image. As depicted in FIG. 2, a diagram illustrating an original signature, repositioned 202, according to an embodiment of the present invention, one can reposition the signature. Also, as depicted in FIG. 3, a diagram illustrating a signature region, including signature and transparent areas 302, according to an embodiment of the present invention, one can extend dark pixels of the signature to create a band of uniform width around strokes of the signature (dilate the signature) image.

In one or more embodiments of the invention, one can also remove pixels of the facial image that would be covered by the dilated image. This step creates at least partially transparent band within the facial image, where background security features would remain visible.

Figure 4:
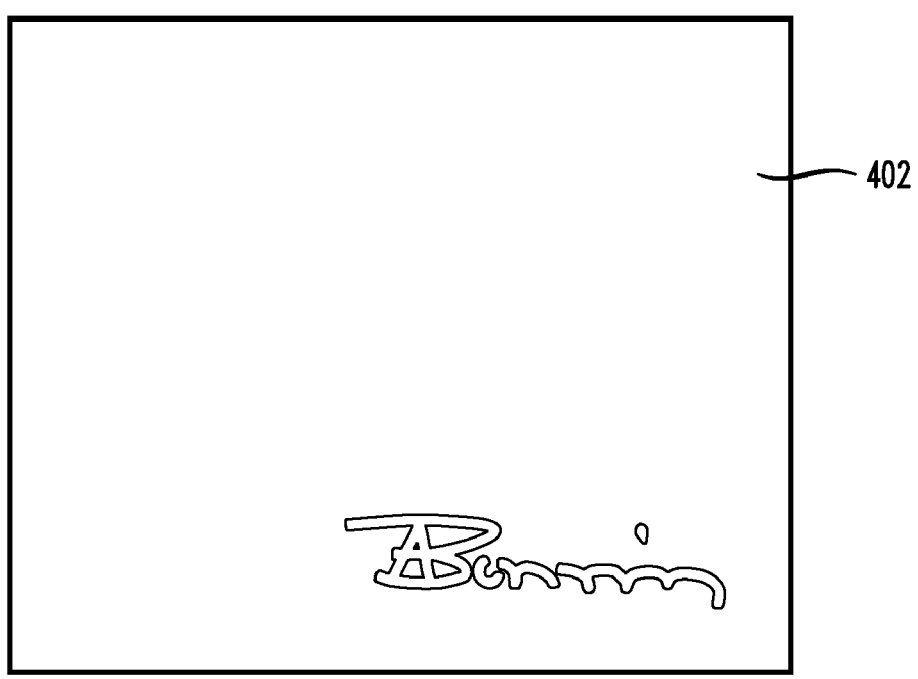
FIG. 4 is a diagram illustrating an authentication data band, according to an embodiment of the present invention.
Figure 5:
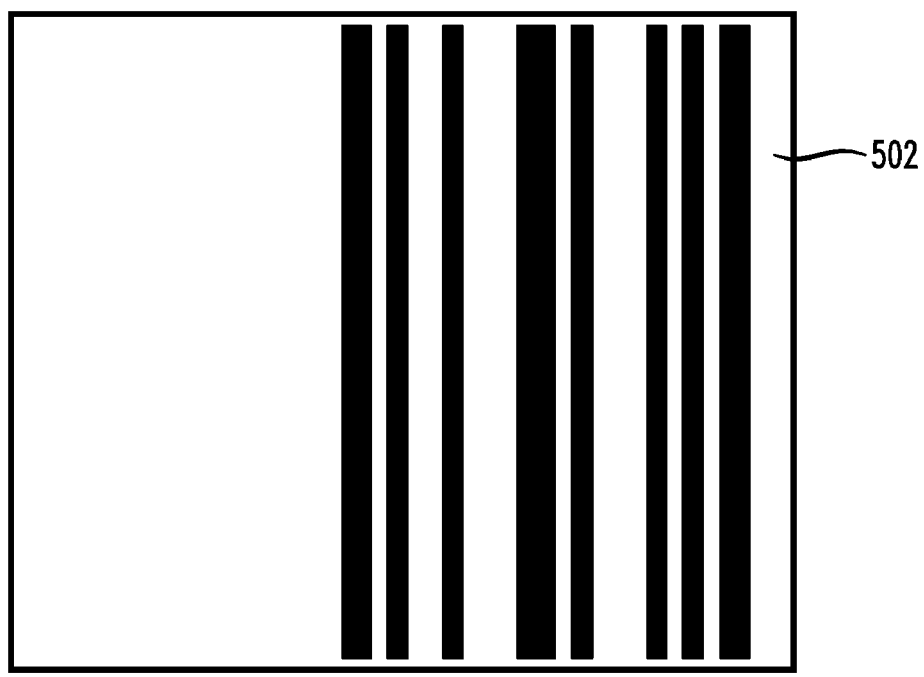
FIG. 5 is a diagram illustrating authentication bits, according to an embodiment of the present invention.
Figure 6:
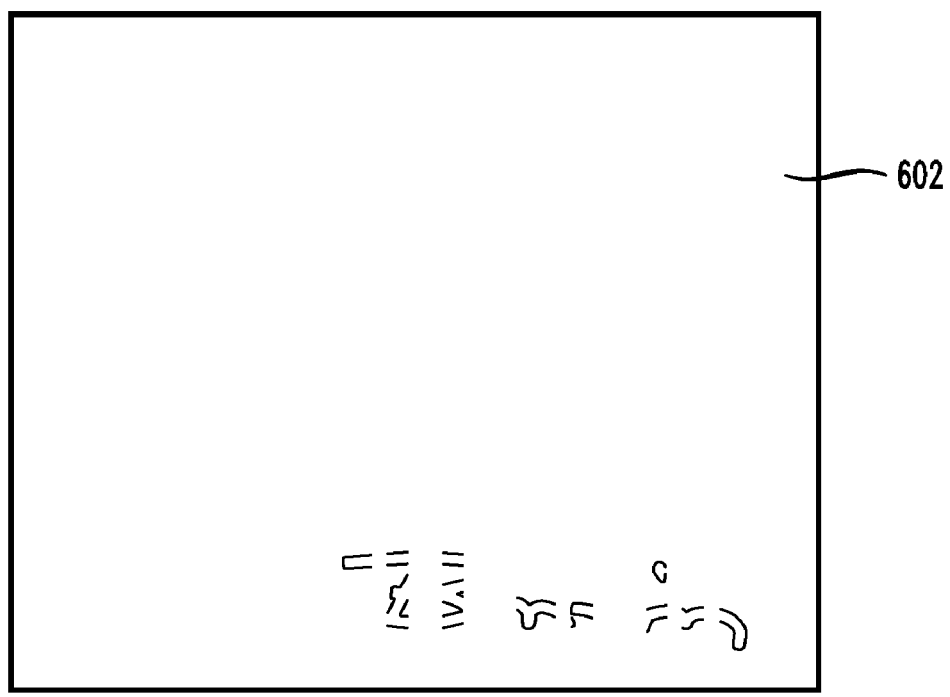
FIG. 6 is a diagram illustrating authentication bits, embedded into an authentication band, according to an embodiment of the present invention.

Additionally, FIG. 4 is a diagram illustrating an authentication data band 402, according to an embodiment of the present invention, FIG. 5 is a diagram illustrating authentication bits 502, according to an embodiment of the present invention, and FIG. 6 is a diagram illustrating authentication bits 602, embedded into an authentication band, according to an embodiment of the present invention.

Further, as depicted by FIG. 7, a diagram illustrating a combined image, without authentication data 702, according to an embodiment of the present invention, one can combine pixels of the signature and the filtered facial image. Dark areas of these two areas may not overlap, by construction, and therefore one can create an image with a clearly observable signature and an obvious transparent band around it (as depicted in FIG. 7). One can also create the authentication band, a thin band that lies in the middle of the transparent band. By construction, pixels of the authentication band will not intersect the signature or the facial image.

Figure 8:
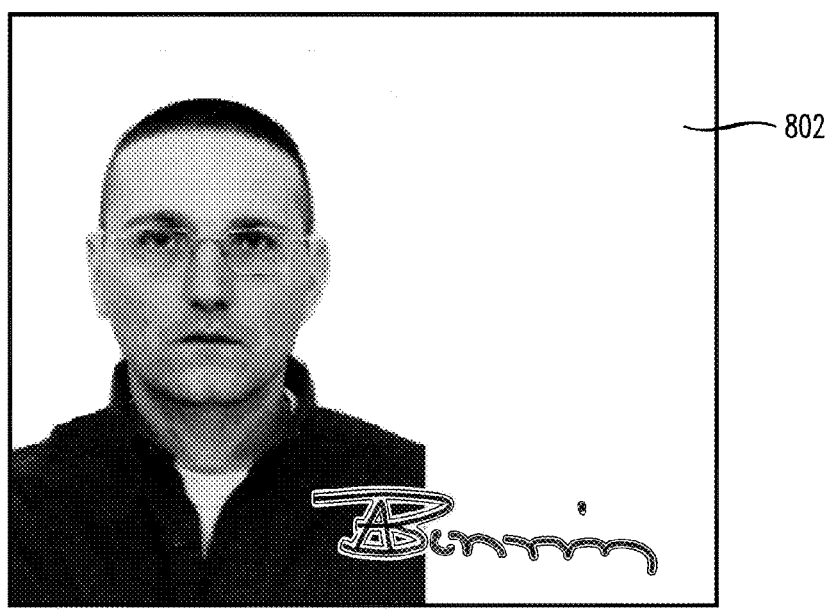
FIG. 8 is a diagram illustrating a combined image, with an authentication band, according to an embodiment of the present invention.

FIG. 8, a diagram illustrating a combined image, with an authentication band 802, according to an embodiment of the present invention, depicts how the band would be positioned relative to the source identity-linked data. One way, for example, of creating the authentication band is to dilate the signature multiple times, with a varying number of pixels, and calculate their intersection. Also, for example, the authentication band (as depicted in FIG. 4) can be in the middle of the band added by dilation (that is, it can be in the middle of the difference of FIG. 2 and FIG. 3). One can split the difference band into three bands of equal width, with the authentication band being the middle band.

Figure 9:
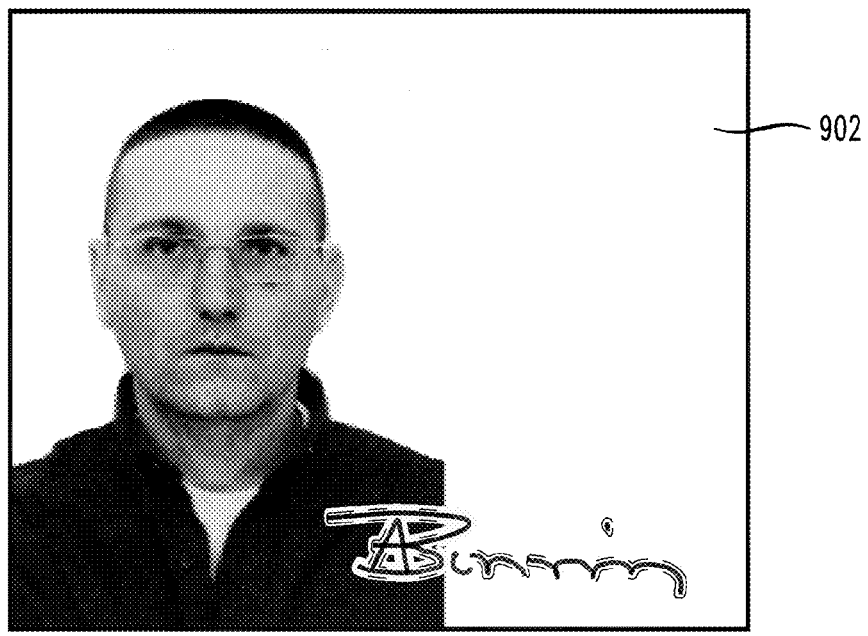
FIG. 9 is a diagram illustrating an engraved image, according to an embodiment of the present invention.

One can additionally encode authentication data into the authentication band using a robust encoding. For example, one can encode MAC bits into vertical lines (as depicted for example, in FIG. 5) and intersect the authentication band with these lines (as depicted, for example, in FIG. 6). Also, FIG. 9 is a diagram illustrating an engraved image 902, according to an embodiment of the present invention.

Figure 10:
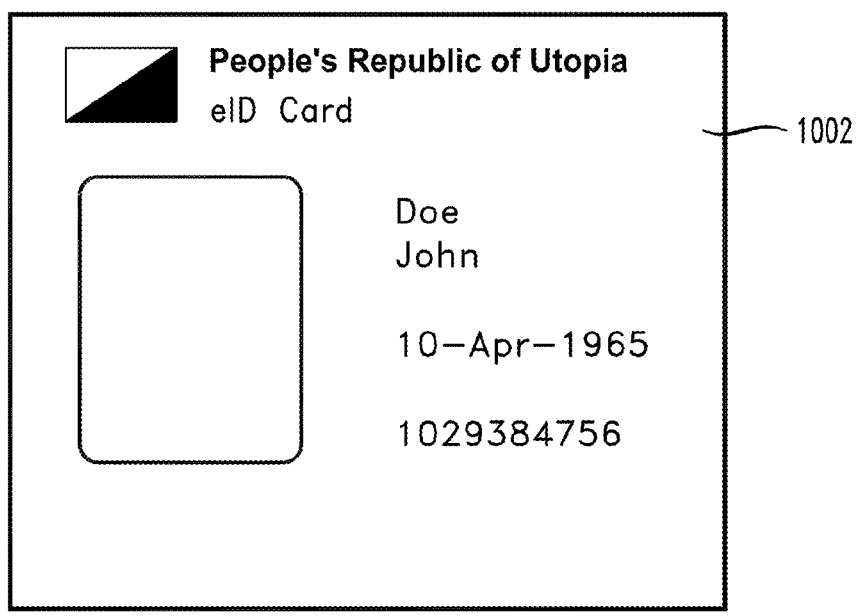
FIG. 10 is a diagram illustrating a photo region of a typical identity car background layout, according to an embodiment of the present invention.
Figure 11:
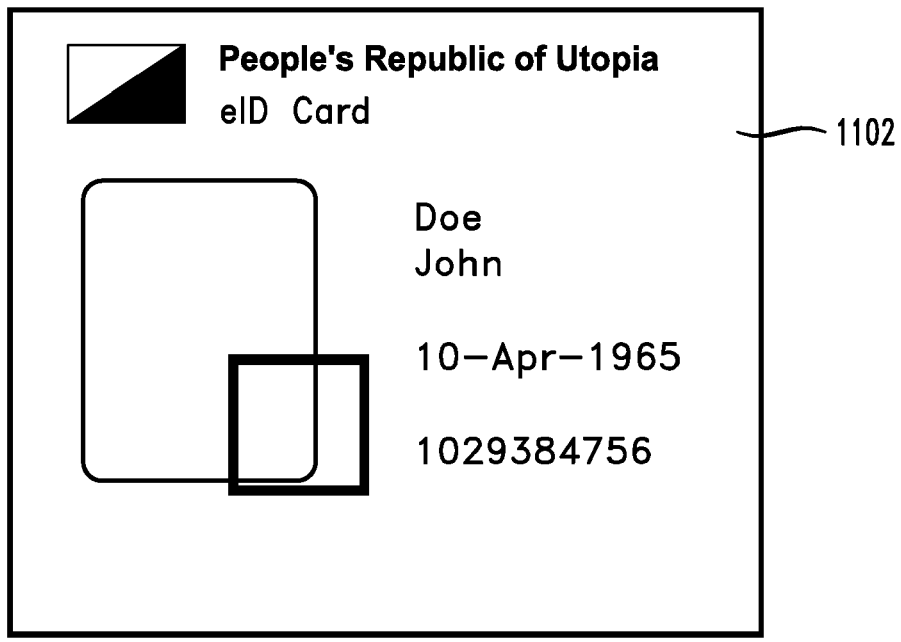
FIG. 11 is a diagram illustrating a region of interest to add security-printed background, according to an embodiment of the present invention.

Further, FIG. 10 is a diagram illustrating a photo region of a typical identity card background layout 1002, according to an embodiment of the present invention, and FIG. 11 is a diagram illustrating a region of interest to add security-printed background 1102, according to an embodiment of the present invention. In an exemplary document design, rectangular areas are left empty (or very lightly illustrated) to accommodate rectangular images (as seen, for example, in FIG. 10). When combining images with transparent regions, regions of the background should include security printing detail, which would show through the engraved image. Assuming a composite layout similar to that depicted in FIG. 7, the highlighted region in FIG. 11 should contain security-printing features (which would show through transparent bands).

While the in-band encoding is, itself, robust, and easily decodable, one may embed further alignment anchors in the combined image to aid automated reading. One or more embodiments of the invention can be trivially extended to provide additional positioning and alignment hints when images are combined.

Figure 12:
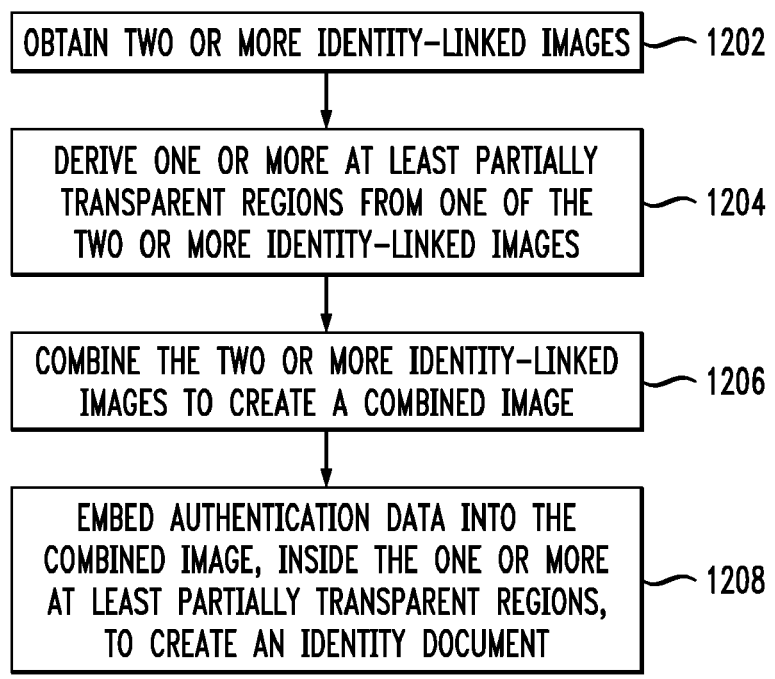
FIG. 12 is a flow diagram illustrating techniques for creating an identity document, according to an embodiment of the present invention.

FIG. 12 is a flow diagram illustrating techniques for creating an identity document, according to an embodiment of the present invention. Step 1202 includes obtaining two or more identity-linked images. The identity-linked images can include, for example, a signature and a facial image. Step 1204 includes deriving one or more at least partially transparent regions from one of the two or more identity-linked images. Step 1206 includes combining the two or more identity-linked images to create a combined image (allowing security-printed background to show through (for example, as in the white areas of FIG. 7)). The combined image can include, for example, a combined image with one or more non-rectangular visible boundaries.

Step 1208 includes embedding authentication data (for example, a message authentication code (MAC)) into the combined image, inside the one or more at least partially transparent regions, to create an identity document. Embedding authentication data into the combined image can include, for example, embedding authentication data into a band inside the one or more at least partially transparent regions, created at a uniform distance from the two or more identity-linked images. Embedding authentication data into the combined image, inside the one or more at least partially transparent regions can also include placing the one or more at least partially transparent regions around a signature with an authentication band substantially within the one or more at least partially transparent regions.

The techniques depicted in FIG. 12 can also include removing one or more regions of an identity-linked image (for example, less-characteristic regions such as, for example, corners of facial images) where they would overlap with at least partially transparent regions. One or more embodiments of the invention can additionally include encoding the authentication data with an encoding (for example, a robust encoding) to allow recovery when read with scanning equipment (for example, even when read with low-resolution scanning equipment). Further, the techniques depicted in FIG. 12 can include engraving the combined image onto an identity document (for example, a security-printed identity document such as a license, passport, etc.).

One or more embodiments of the invention can additionally include an identity token (and/or document) including two or more identity-linked images, wherein the two or more identity-linked images are combined to create a combined image, one or more at least partially transparent regions derived from one of the two or more identity-linked images, and authentication data, wherein the authentication data is embedded into the combined, inside the one or more at least partially transparent regions. Also, the one or more at least partially transparent regions can be placed around a signature with an authentication band substantially within the one or more at least partially transparent regions.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 13:
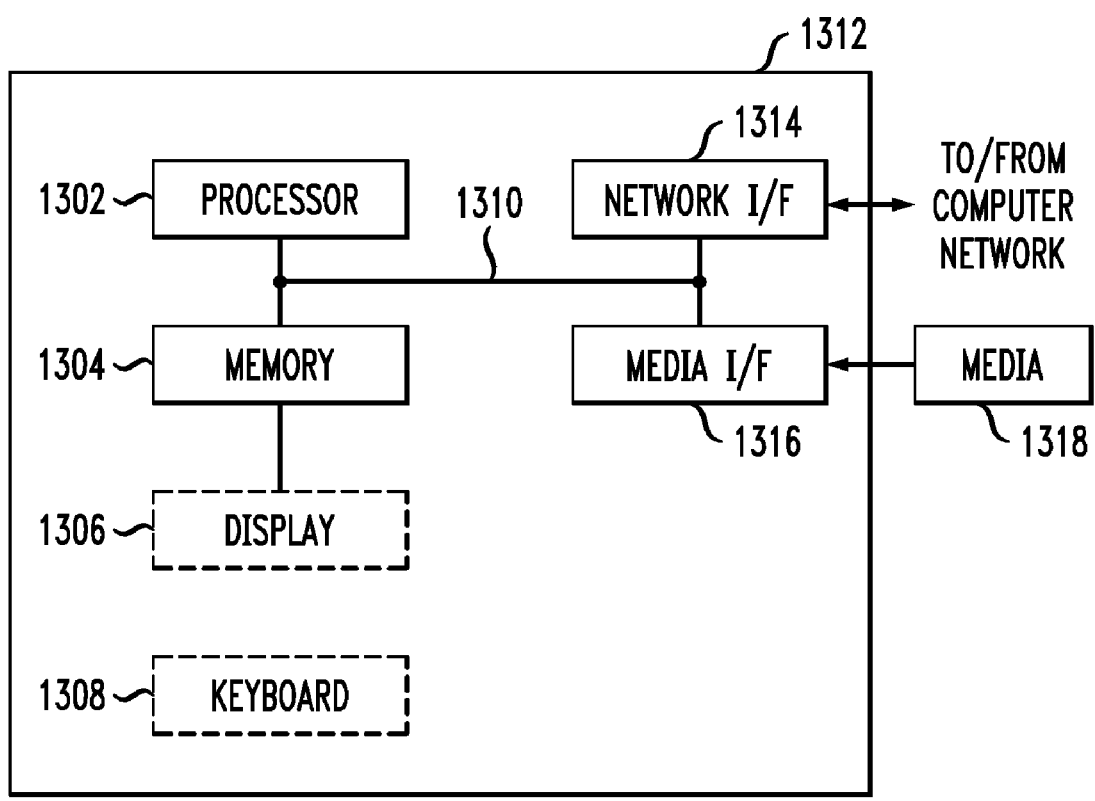
FIG. 13 is a system diagram of an exemplary computer system on which at least one embodiment of the present invention can be implemented.

At present, it is believed that the preferred implementation will make substantial use of software running on a general-purpose computer or workstation. With reference to FIG. 13, such an implementation might employ, for example, a processor 1302, a memory 1304, and an input and/or output interface formed, for example, by a display 1306 and a keyboard 1308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 1302, memory 1304, and input and/or output interface such as display 1306 and keyboard 1308 can be interconnected, for example, via bus 1310 as part of a data processing unit 1312. Suitable interconnections, for example via bus 1310, can also be provided to a network interface 1314, such as a network card, which can be provided to interface with a computer network, and to a media interface 1316, such as a diskette or CD-ROM drive, which can be provided to interface with media 1318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 1304), magnetic tape, a removable computer diskette (for example, media 1318), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 1302 coupled directly or indirectly to memory elements 1304 through a system bus 1310. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 1308, displays 1306, pointing devices, and the like) can be coupled to the system either directly (such as via bus 1310) or through intervening I/O controllers (omitted for clarity).

Network adapters such as network interface 1314 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, merging of different identity linked images.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for creating an identity document, comprising the steps of:
    obtaining two or more identity-linked images;
    deriving one or more at least partially transparent regions from one of the two or more identity-linked images;
    combining the two or more identity-linked images to create a combined image; and
    embedding authentication data into the combined image, inside the one or more at least partially transparent regions, to create the identity document.

2. The method of claim 1, further comprising removing one or more regions of the two or more identity-linked images where they would overlap with the one or more at least partially transparent regions.

3. The method of claim 1, further comprising encoding the authentication data with an encoding to allow recovery when read with scanning equipment.

4. The method of claim 1, further comprising engraving the combined image onto the identity document.

5. The method of claim 1, wherein the combined image comprises the combined image with one or more non-rectangular visible boundaries.

6. The method of claim 1, wherein the two or more identity-linked images comprise a signature and a facial image.

7. The method of claim 1, wherein embedding the authentication data into the combined image, inside the one or more at least partially transparent regions, to create the identity document comprises embedding the authentication data into a band inside the one or more at least partially transparent regions, created at a uniform distance from the two or more identity-linked images.

8. The method of claim 1, wherein embedding the authentication data into the combined image, inside the one or more at least partially transparent regions comprises placing the one or more at least partially transparent regions around a signature with an authentication band substantially within the one or more at least partially transparent regions.

9. A computer program product comprising a tangible computer readable recordable storage medium having computer readable program code for creating an identity document, said computer program product including:
    computer readable program code for obtaining two or more identity-linked images;
    computer readable program code for deriving one or more at least partially transparent regions from one of the two or more identity-linked images;
    computer readable program code for combining the two or more identity-linked images to create a combined image; and
    computer readable program code for embedding authentication data into the combined image, inside the one or more at least partially transparent regions, to create the identity document.

10. The computer program product of claim 9, wherein the combined image comprises the combined image with one or more non-rectangular visible boundaries.

11. The computer program product of claim 9, wherein the two or more identity-linked images comprise a signature and a facial image.

12. The computer program product of claim 9, wherein the computer readable code for embedding the authentication data into the combined image, inside the one or more at least partially transparent regions, to create the identity document comprises computer readable program code for embedding the authentication data into a band inside the one or more at least partially transparent regions, created at a uniform distance from the two or more identity-linked images.

13. The computer program product of claim 9, further comprising computer readable program code for removing one or more regions of the two or more identity-linked images where they would overlap with the one or more at least partially transparent regions.

14. The computer program product of claim 9, further comprising computer readable program code for encoding the authentication data with an encoding to allow recovery when read with scanning equipment.

15. The computer program product of claim 9, further comprising computer readable program code for engraving the combined image onto the identity document.

16. The computer program product of claim 9, wherein the computer readable code for embedding the authentication data into the combined image, inside the one or more at least partially transparent regions comprises computer readable program code for placing the one or more at least partially transparent regions around a signature with an authentication band substantially within the one or more at least partially transparent regions.

17. An apparatus for creating an identity document, comprising:
   a memory; and
   at least one processor coupled to said memory and operative to:
      obtain two or more identity-linked images;
      derive one or more at least partially transparent regions from one of the two or more identity-linked images;
      combine the two or more identity-linked images to create a combined image; and
      embed authentication data into the combined image, inside the one or more at least partially transparent regions, to create the identity document.

18. The apparatus of claim 17, wherein the combined image comprises the combined image with one or more non-rectangular visible boundaries.

19. The apparatus of claim 17, wherein the two or more identity-linked images comprise a signature and a facial image.

20. The apparatus of claim 17, wherein in embedding the authentication data into the combined image, inside the one or more at least partially transparent regions, to create the identity document, the at least one processor coupled to said memory is further operative to embed the authentication data into a band inside the one or more at least partially transparent regions, created at a uniform distance from the two or more identity-linked images.

21. The apparatus of claim 17, wherein the at least one processor coupled to said memory is further operative to remove one or more regions of the two or more identity-linked images where they would overlap with the one or more at least partially transparent regions.

22. The apparatus of claim 17, wherein the at least one processor coupled to said memory is further operative to encode the authentication data with an encoding to allow recovery when read with scanning equipment.

23. The apparatus of claim 17, wherein in embedding the authentication data into the combined image, inside the one or more at least partially transparent regions, the at least one processor coupled to said memory is further operative to place the one or more at least partially transparent regions around a signature with an authentication band substantially within the one or more at least partially transparent regions.

24. An identity token, said identity token comprising:
   two or more identity-linked images, wherein the two or more identity-linked images are combined to create a combined image;
   one or more at least partially transparent regions derived from one of the two or more identity-linked images; and
   authentication data, wherein the authentication data is embedded into the combined image, inside the one or more at least partially transparent regions.

25. The identity token of claim 24, wherein the one or more at least partially transparent regions is placed around a signature with an authentication band substantially within the one or more at least partially transparent regions.

* * * * *